United States Patent [19]

Suhara et al.

[11] 4,270,996
[45] Jun. 2, 1981

[54] CATION EXCHANGE MEMBRANE OF FLUORINATED POLYMER FOR ELECTROLYSIS AND ELECTROLYSIS USING THE MEMBRANE

[75] Inventors: Manabu Suhara; Shoziro Goto; Kiyotaka Arai, all of Yokohama, Japan

[73] Assignee: Asahi Glass Company, Ltd., Tokyo, Japan

[21] Appl. No.: 79,198

[22] Filed: Sep. 26, 1979

[30] Foreign Application Priority Data

Sep. 26, 1978 [JP] Japan ................... 53/117474

[51] Int. Cl.$^3$ .................. C25B 1/34; C25B 13/08
[52] U.S. Cl. .................. 204/98; 204/128; 204/296
[58] Field of Search ................. 204/296, 98, 128

[56] References Cited

U.S. PATENT DOCUMENTS

| | | | |
|---|---|---|---|
| 4,065,366 | 12/1977 | Oda et al. | 204/98 |
| 4,089,759 | 5/1978 | Krumpelt et al. | 204/98 |

FOREIGN PATENT DOCUMENTS 53-81485  6/1978  Japan .

*Primary Examiner*—R. L. Andrews
*Attorney, Agent, or Firm*—Oblon, Fisher, Spivak, McClelland & Maier

[57] ABSTRACT

A cation exchange membrane of a fluorinated polymer used for an electrolysis of an alkali metal chloride is obtained by treating a cation exchange membrane having ion exchange groups of —COOM (M is hydrogen atom or an alkali metal atom) or groups being convertible to said groups and having an ion exchange capacity ($A_R$) of 0.5 to 2.0 meq/g dry polymer in a hydrolyzed form, to give a weight gain percent ($\Delta W_R$) in the range of $\Delta W_R = 1.6e^{1.74R}$ as the upper side; $\Delta W_R = 0.8e^{1.74R}$ as the lower side; $A_R = 0.5$ as the left side and $A_R = 2.0$ as the right side shown in FIG. 1 (log scale on ordinate) in an aqueous medium of a base or a salt at a concentration of 1 to 20 wt. % at the temperature of 0° to 60° C. after the hydrolysis or at the time of the hydrolysis.

12 Claims, 2 Drawing Figures

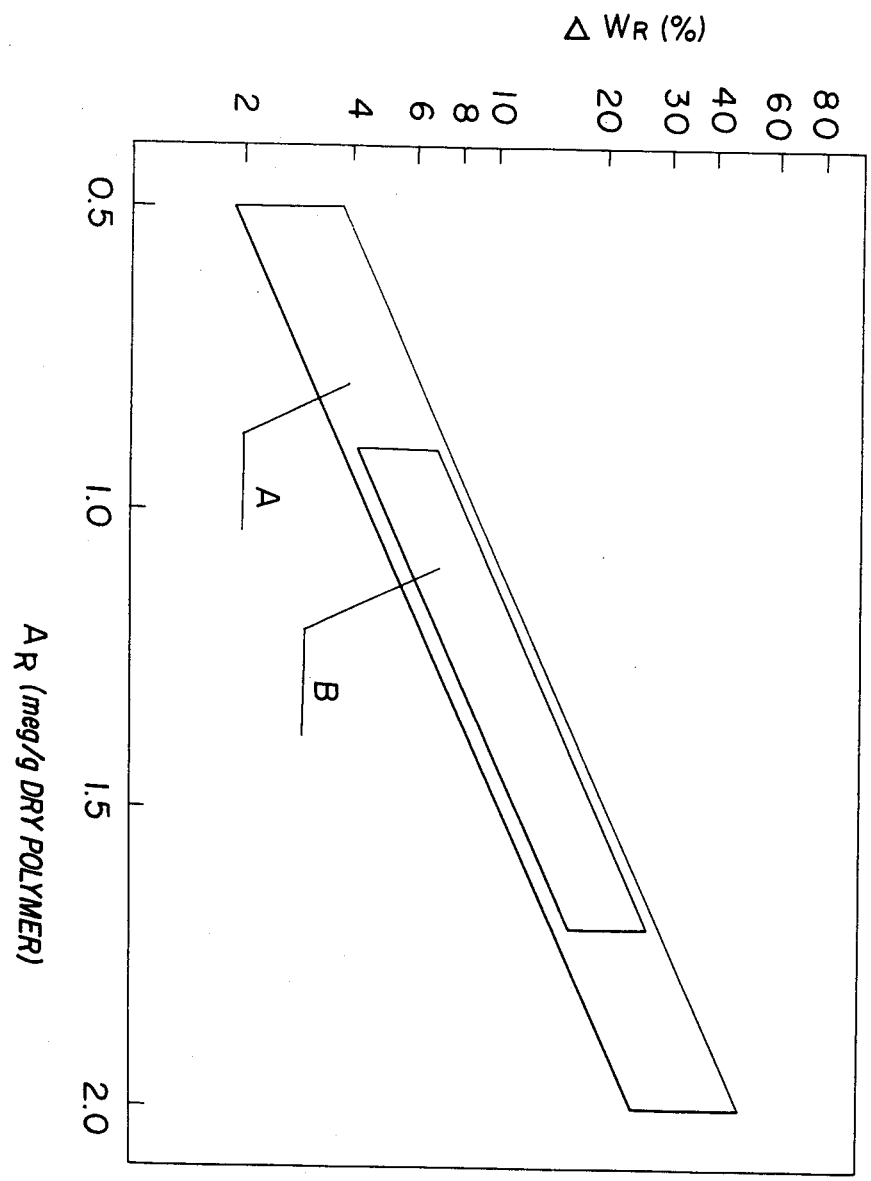

CATION EXCHANGE MEMBRANE OF FLUORINATED POLYMER FOR ELECTROLYSIS AND ELECTROLYSIS USING THE MEMBRANE

BACKGROUND OF THE INVENTION

1. Field of the Invention

The present invention relates to a cation exchange membrane of a fluorinated polymer for an electrolysis of an alkali metal chloride which has excellent electrolytic characteristic and mechanical characteristics and an electrolysis of an aqueous solution of an alkali metal chloride using the membrane.

2. Description of the Prior Arts

It has been known to produce chlorine in an anode compartment and alkali metal hydroxide in a cathode compartment by partitioning the anode compartment and the cathode compartment with a diaphragm and feeding an aqueous solution of an alkali metal chloride into the anode compartment to electrolyze it. The method has been known as a two-compartment type diaphragm electrolysis.

Recently, it has been proposed to use a cation exchange membrane of fluorinated polymer which does not substantially pass the electrolyte and selectively pass only alkali metal ions and has high alkali resistance and chlorine resistance.

When such cation exchange membrane is used as the membrane, the electrolyte is not substantially passed through the membrane, but only alkali metal ions are selectively passed whereby the contamination of an alkali metal chloride in an alkali metal hydroxide can be prevented to obtain a product having a satisfactory purity.

However, the current efficiency has not been satisfactory, when the conventional cationic exchange membrane of a fluorinated polymer is used. It has been proposed to give excellent electric characteristics of the increase of the current efficiency in the electrolysis and the remarkable decreases of the electrolytic voltage of an alkali metal chloride by using a cationic exchange membrane of a carboxylic acid type fluorinated polymer having —COOM (M represents a hydrogen atom or an alkali metal atom) as ion exchange group.

When such cation exchange membrane of the carboxylic acid type fluorinated polymer is used for the electrolysis of an aqueous solution of an alkali metal chloride, the electrolytic characteristics are excellent, however wrinkle are easily caused in the membrane during the electrolysis. The gas formed in the electrolysis is stayed at the parts of the wrinkle to increase the cell voltage. When the membrane is used for a long period, the deterioration of the tissue of the membrane is caused. The membrane is contacted with the net type electrode by the wrinkle so as to cause a damage of the membrane, sometimes.

The ununiform flow of the electrolyte is caused in the electrode compartments by the wrinkle. In such cases, the concentration of the alkali metal chloride is partially decreased and the flow resistance of the solution is increased and the current efficiency is decreased as the troubles.

The inventors have studied to overcome various troubles caused by the formation of the wrinkle in the cation exchange membrane of the carboxylic acid type fluorinated polymer.

SUMMARY OF THE INVENTION

It is an object of the present invention to provide a cation exchange membrane of a carboxylic acid type fluorinated polymer in which the formation of wrinkle is prevented during the electrolysis of an alkali metal chloride.

It is another object of the present invention to overcome the troubles caused by the formation of wrinkle during the electrolysis of an alkali metal chloride and to prevent the decrease of electrolytic characteristics caused by the formation of wrinkle.

The foregoing and other objects of the present invention have been attained by providing a cation exchange membrane of a fluorinated polymer used for an electrolysis of an alkali metal chloride by treating a cation exchange membrane having ion exchange groups of —COOM (M is hydrogen atom or an alkali metal atom) or groups being convertible to said groups and having an ion exchange capacity ($A_R$) of 0.5 to 2.0 meq/g dry polymer if necessary, after hydrolyzing it to give a weight gain percent ($\Delta W_R$) in the range of $\Delta W_R = 1.6 e^{1.7 A_R}$ as the upper side; $\Delta W_R = 0.8 e^{1.7 A_R}$ as the lower side; $A_R = 0.5$ as the left side and $A_R = 2.0$ as the right side shown in FIG. 1 (log scale in ordinate) in an aqueous medium of a base or a salt at a concentration of 1 to 20 wt. % at the temperature of 0° to 60° C.

The weight gain percent is based on the weight of dry membrane having Na or K type ion exchange groups.

BRIEF DESCRIPTION OF THE DRAWING

FIG. 1(A) shows a preferable range of the relation between an ion exchange capacity ($A_R$) and a weight gain ($\Delta W_R$) percent after treatment of the present invention.

FIG. 1(B) shows an optimum range of the relation between ($A_R$) and ($\Delta W_R$).

The ordinate is described in a log range.

DETAILED DESCRIPTION OF THE PREFERRED EMBODIMENTS

It is not clearly understood why the formation of wrinkle in the cation exchange membrane of a fluorinated polymer can be prevented by the treatment under said specific condition. Thus, it is considered that the swelling in the pretreatment is enough to prevent further swelling during the electrolysis even though it is immersed in a dilute solution of the base or salt maintained at relatively low temperature.

However, it has been considered that a membrane having high swellability causes the increase of diffusion of hydroxyl ions from the cathode compartment so as to give inferior electrolytic characteristics such as the current efficiency.

It is an unexpected result to give excellent electrolytic characteristics by the treatment of the present invention.

In accordance with the present invention, the cation exchange membrane for an electrolysis which has excellent electrolytic and mechanical characteristics can be obtained by a pretreatment of the present invention at the time of the hydrolysis of the ion exchange groups of —COOM (defined above) or later. When the pretreatment is carried out after the hydrolysis, the neutral salt can be used as mentioned below. Thus, it is necessary to consider the alkali protection of the pretreated membrane whereby the transferring and storage of the membrane and the assembly of the electrolytic cell are remarkably easy.

The present invention will be further illustrated.

The cation exchange membranes of the fluorinated polymer have functional groups of —COOM (M is hydrogen atom or an alkali metal atom) or functional groups being converted to said groups by the hydrolysis and have the ion exchange capacity of 0.5 to 2.0 meq/g dry polymer.

When the ion exchange capacity is higher or lower than said range, the electrolytic characteristics are disadvantageously deteriorated. It is preferable to use the fluorinated polymer having the ion exchange capacity of 0.7 to 1.7 meq/g dry polymer.

A preferable fluorinated polymer which is used for the cation exchange membrane of this invention has the following units of $$\text{─}(CF_2\text{─}CXX')\text{─} \quad \text{and} \quad (a)$$

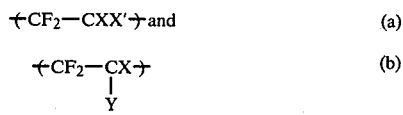
(b)

wherein
X represents fluorine, chlorine, or —CF$_3$;
X' represents X or CF$_3$(CF$_2$)—$_m$;
m represents 1 to 5 ; and Y represents

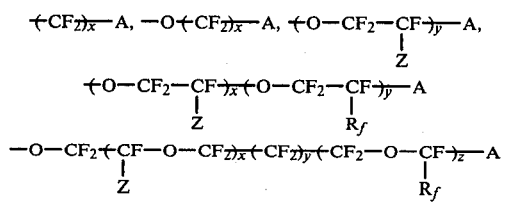

wherein x, y and z respectively represent 1 to 10 and Z and R$_f$ represent respectively —F or a C$_1$-C$_{10}$ perfluoroalkyl group; A represents —COOM or —CN, —COF, —COOR$_1$, —CONR$_2$R$_3$, —CF$_2$SO$_2$F which can be converted to —COOM by hydrolysis, neutralization, oxidation or reduction; R$_1$-R$_3$ represent a C$_1$-C$_{10}$ alkyl group.

The polymer having the units of (a) and (b) preferably comprises 1 to 40 mole %, especially 3 to 25 mole % of the units of (b) so as to give the above-mentioned range of the ion exchange capacity of the membrane.

The molecular weight of the fluorinated polymer for the cation exchange membrane of the present invention is important as it influences the mechanical and electrochemical characteristics of the membrane. When the molecular weight is shown by the temperature (T$_Q$) to give a volumetric melt flow rate of 100 m$^3$/sec. which is below defined, it is preferable to have high molecular weight to give T$_Q$ of 130° to 350° C., especially 160° to 300° C.

In the preparation of the fluorinated polymers, the fluorinated olefin monomers and the comonomers having the carboxylic acid type functional group can be copolymerized.

The copolymers can be modified by using two or more monomers or adding a third monomer. For example, the flexibility is imparted by combining CF$_2$=CFOR$_f$ wherein R$_f$ represents a C$_1$-C$_{10}$ perfluoroalkyl group. For example, improved mechanical strength can be imparted by crosslinking the copolymer by combining a divinyl monomer such as CF$_2$=CF—CF=CF$_2$, 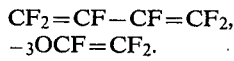 

The copolymerization of the fluorinated olefin with the comonomer having the carboxylic acid type functional group or the third monomer, can be carried out by suitable conventional methods.

The copolymerization can be carried out by a catalytic polymerization, a thermal polymerization or a radiation-induced polymerization by using a solvent such as halogenated hydrocarbons, if necessary.

The cation exchange membrane of the fluorinated polymer can be prepared by the conventional process for fabricating a membrane such as a press-molding method, a roll-molding method, an extrusion method, a solution spreading method, a dispersion molding method and a powder molding method, to give a thickness of 20 to 600μ preferably 50 to 400μ.

In the preparation of the membrane, it is preferable to be made of only the fluorinated polymer described. The membrane, however can be made one side of which faced to a cathode is made of said fluorinated polymer.

The pretreatment of the fluorinated polymer of the present invention can be carried out before, during or after the fabrication of the fluorinated polymer, preferably after the fabrication into the membrane.

The pretreatment can be carried out for the fluorinated polymer having the groups of —COOM. When the fluorinated polymer having functional groups convertible to —COOM such as —CN, —COF, —COOR, or —COONR$_2$R$_3$(R$_1$-R$_3$ are defined above) is used, the pretreatment of the present invention and the hydrolysis can be simultaneously carried out.

In the present invention, it is necessary to give the weight gain percent ($\Delta W_R$) to said range by the pretreatment.

According to the studies by the inventors, said range of the weight gain percent can be function of the ion exchange capacity (A$_R$). As shown (A) in FIG. 1, the range is $\Delta W_R = 1.6e^{1.7A_R}$ as the upper side; $\Delta W_R = 0.8e^{1.7A_R}$ as the lower side; A$_R$=0.5 as the left side and A$_R$=2.0 as the right side.

When the weight gain percent ($\Delta W_R$) is higher to cause excess swelling, the electrolytic characteristics especially the current efficiency is lowered whereas when $\Delta W_R$ is lower to be less swelling, the purpose of the present invention is not attained.

In view of the mechanical and electrolytical characteristics of the membrane, it is preferable to give the range of $\Delta W_R = 1.5e^{1.7A_R}$ as the upper side; $\Delta W_R = 0.9e^{1.5A_R}$ as the lower side; A$_R$=0.9 as the left side and A$_R$=1.7 as the right side, which is shown (B) in FIG. 1. Especially, it is preferable to give the range of $\Delta W_R = 1.0e^{1.7A_R}$ as the lower side, $\Delta W_R = 1.5e^{1.7A_R}$ as the upper side, A$_R$=0.9 as the left side and A$_R$=1.7 as the right side in the case of the electrolysis of an aqueous solution of sodium chloride; and to give the range of $\Delta W_R = 0.9e^{1.7A_R}$ as the lower side; $W_R = 1.2e^{1.7A_R}$ as the upper side; A$_R$=0.9 as the left side and A$_R$=1.7 as the right side in the case of the electrolysis of potassium chloride.

The pretreatment for providing $\Delta W_R$ in said range can be carried out by selecting the medium, the concentration and the temperature. When the hydrolysis of the convertible groups into —COOM and the pretreatment of the present invention are simultaneously carried out, the medium having the function for the hydrolysis is selected. Such medium include aqueous solution of an alkali metal hydroxide or an alkaline earth metal hydroxide especially the aqueous solution of the alkali metal hydroxide whose alkali metal is the same as the alkali metal chloride for the electrolysis.

On the other hand, when the hydrolysis and the pretreatment of the present invention are separately carried out, the medium need not to have the function for hydrolysis. The medium can be aqueous solution of neutral salts of alkali metal or alkaline earth metal such as halides e.g. chloride, bromide and iodide; sulfates and phosphates as well as an alkali metal hydroxide and an alkaline earth metal hydroxide.

When the aqueous solution of neutral salt is used as the medium, the handling of the membrane is easy in comparison with the use of the aqueous solution of alkali metal hydroxide because a alkali protection is not required.

The concentration of the medium and the temperature in the pretreatment are important factors.

The concentration of the medium is relatively low usually in a range of 1 to 20 wt. % especially 4 to 15 wt. %. The temperature for the pretreatment is relatively low in a range of 0° to 60° C. preferably 5° to 40° C. The time for the pretreatment is selected to give suitable $\Delta W_R$ and is usually in a range of 1 minute to 100 hours preferably 10 minutes to 48 hours.

The concentration, the temperature and the time for the pretreatment have relative relations and are selected so as to give $\Delta W_R$ in said range.

In usual, when the concentration of the medium is high, excess swelling is not caused by the pretreatment even at high temperature. Thus, when the concentration is high, the temperature and the time for the pretreatment can be high and long. On the other hand, when the concentration is low, excess swelling is caused by the pretreatment at high temperature. Thus, the temperature and the time for the pretreatment are low and short.

The pretreatment of the present invention can be carried out in the atmospheric pressure, and if necessary, it can be under a reduced pressure or an elevated pressure up to 20 kg/cm². The pretreatment can be carried out after assembling the membrane in the electrolytic cell; if desired.

The cation exchange membrane of the fluorinated polymer can be produced by blending a polymer of olefin such as polyethylene polypropylene, preferably, polytetrafluoroethylene or a fluorinated copolymer of ethylene and tetrafluoroethylene to the carboxylic acid type fluorinated polymer in the step of fabrication of the membrane. It is also possible to reinforce the cation exchange membrane by incorporating into the membrane a fabric such as a cloth and a net; a nonwoven fabric; a fibril or a porous film which is made of said polymer. The weight of the blended polymer and the reinforcing material is not invalued for the determination of the ion exchange capacity and the weight gain percent.

The process for producing an alkali metal hydroxide by an electrolysis of an aqueous solution of an alkali metal chloride can be the conventional processes, for example, the electrolysis is carried out in a cell voltage of 2.3 to 5.5 volt and a current density of 5 to 100 A/dm² with an aqueous solution of an alkali metal chloride. The anode used in the electrolysis can be graphite or an anticorrosive electrode having demensional stability which is made of a titanium substrate coated with a platinum group metal or an oxide of a platinum group metal. The electrolyte cell system can be unipolar or multipolar type.

In the case of two compartment type electrolytic cell prepared by partitioning an anode and a cathode with the cation exchange membrane to form an anode compartment and a cathode compartment and feeding an aqueous solution of an alkali metal chloride into the anode compartment and electrolyzing it to obtain an aqueous solution of an alkali metal hydroxide from the cathode compartment, it is possible to produce sodium hydroxide having high concentration of higher than 40% at high current efficiency of higher than 90% by electrolyzing an aqueous solution of sodium chloride having higher than 2N-NaCl at 40° to 120° C. preferably 70° to 100° C. in a current density of 5 to 50 A/dm².

A further understanding can be obtained by reference to certain specific examples which are provided herein for purposes of illustration only and are not intended to be limiting unless otherwise specified.

An ion exchange capacity of a cation exchange membrane was measured as follows.

In 10 ml of 0.3N-NaOH methanol solution, 1 g of a fabricated methyl ester type membrane was dipped at 60° C. for 16 hours to complete the hydrolysis. The residual amount of NaOH in the solution was measured by a back titration with 1N-HCl.

A 1 g of a sample of the copolymer is extruded through a nozzle having a diameter of 1 mm and a length of 2 mm under a predetermined pressure of 30 Kg/cm² at a predetermined temperature. The volumetric melt flow rate is shown by the amount of polymer flowed in the unit of mm³/sec.

The weight gain percent was measured as follows. A membrane was taked up from a medium and the medium adhered on the membrane was wipped off and the weight ($W_1$) of the membrane was weighed. The membrane was washed with water and dried at 130° C. for 8 hours under a reduced pressure and the weight ($W_2$) of the membrane was weighed. The weight gain percent ($\Delta W_R$) is calculated by following formula. From the weight of the blended polymer and the reforcing material are subtracted from each weight.

$$\Delta W_R = \frac{W_2}{W_2 - W_1} \times 100$$

EXAMPLE 1

Tetrafluoroethylene and $CF_2\!=\!CFO(CF_2)_3COOCH_3$ were copolymerized with a catalyst of azobisisobutyronitrile in trichlorotrifluoroethane under a pressure of 17.5 atm. to obtain a fluorinated copolymer having an ion-exchange capacity of 1.46 meq/g polymer and $T_Q$ of 230° C. The resulting fluorinated polymer was press-molded to form a film having a thickness of 300μ.

The membrane was hydrolysed in 25% aqueous solution of sodium hydroxide at 90° C. for 16 hours and then, the membrane was further pre-treated with each aqueous solution of sodium hydroxide at various concentration under the condition shown in Table 1.

Each electrolysis of an aqueous solution of sodium chloride was carried out by using the resulting membranes of Example 1-1 to 1-3 and Reference 1 under the following condition. The electrolytic characteristics were measured and the wrinkle formed in the membranes after the electrolysis for 50 days were observed. The results are shown in Table 1.

Two compartment type electrolytic cell was prepared by partitioning an anolyte and a catholyte with the cation exchange membrane and using an anode of titanium coated with ruthenium oxide and a cathode made of stainless steel with a space of the electrodes of 0.5 cm and an effective area of 25 cm². The electrolysis of sodium chloride was carried out under the following conditions.

The anode compartment was filled with 5N-NaCl aqueous solution and the cathode compartment was filled with 25% NaOH aqueous solution. The electrolysis was carried out by feeding 5N-NaCl aqueous solution at a rate of 180 cc/hour into an anode compartment and feeding water into a cathode compartment so as to result about 35% NaOH aqueous solution with a current density of 20 A/cm² at 90° C.

The aqueous solution of sodium chloride was overflowed from the anode compartment and the current efficiency was measured from the amount of NaOH which was produced by the electrolysis.

TABLE 1

| No. | Condition | | | | Characteristic | |
|---|---|---|---|---|---|---|
| | Conc. (%) | Temp. (°C.) | Time (hr.) | $\Delta W_R$ (%) | Current eff. (%) | Wrinkle |
| Exp. 1-1 | 13.8 | 60 | 16 | 13.2 | 95 | Slightly |
| Exp. 1-2 | 13.8 | 40 | 16 | 12.5 | 95 | Slightly |
| Exp. 1-3 | 7.4 | 40 | 16 | 16.3 | 95 | None |
| Ref. 1 | 25 | 90 | 16 | 8.8 | 95 | Wrinkle |

EXAMPLE 2

The copolymer made of the same monomers of Example 1 was used for preparing membranes of fluorinated polymers having different ion exchange capacities and different $T_Q$.

In accordance with the process of Example 1 except varying the conditions, the hydrolysis and the pretreatment of each membrane were simultaneously carried out and each resulting membrane was tested in the electrolytic cell of Example 1. The results are shown in Table 2.

TABLE 2

| No. | Membrane | | Condition | | | | Characteristic | |
|---|---|---|---|---|---|---|---|---|
| | Exchange capacity | $T_Q$ (°C.) | Conc. (%) | Temp. (°C.) | Time (hr.) | $W_R$ (%) | Current eff. (%) | Wrinkle |
| Exp. 2-1 | 1.22 | 200 | 11.2 | 60 | 16 | 9.6 | 97 | None |
| Exp. 2-2 | 1.36 | 230 | 9.2 | 50 | 16 | 12.1 | 96 | None |
| Exp. 2-3 | 1.43 | 230 | 7.4 | 40 | 16 | 15.0 | 95 | None |
| Exp. 2-4 | 1.56 | 200 | 7.4 | 40 | 16 | 18.3 | 93 | None |

EXAMPLE 3

The fluorinated polymer having the ion exchange capacity and $T_Q$ of Example 1 was mixed with 27 wt. % of the fine powder of polytetrafluoroethylene (a secondary particle diameter of 480µ and a specific surface area of 9.0 m²) and then fabricated into the membrane in accordance with Example 1. The hydrolysis of methyl ester groups was carried out in 25% aqueous solution of NaOH at 90° C. for 16 hours. The pretreatment was carried out with each aqueous solution of NaOH at the concentration under the condition shown in Table 3.

In accordance with the process of Example 1 except using each cation exchange membrane, the electrolysis was carried out and the characteristics were measured. The results are shown in Table 3.

TABLE 3

| No. | Condition | | | | Characteristics | |
|---|---|---|---|---|---|---|
| | Conc. (%) | Temp. (°C.) | Time (hr.) | $\Delta W_R$ (%) | Current eff. (%) | Wrinkle |
| Exp. 3-1 | 13.8 | 25 | 16 hr. | 10.9 | 95 | Slightly |
| Exp. 3-2 | 7.4 | 25 | 16 hr. | 14.2 | 94 | None |
| Exp. 3-3 | 3.8 | 25 | 16 hr. | 15.9 | 95 | None |
| Exp. 3-4 | 3.8 | 25 | 1 hr. | 15.5 | 95 | None |
| Exp. 3-5 | 3.8 | 25 | 10 min. | 15.1 | 94 | None |
| Exp. 3-6 | 3.8 | 15 | 1 hr. | 15.3 | 95 | None |
| Exp. 3-7 | 3.8 | 5 | 1 hr. | 15.1 | 95 | None |

EXAMPLE 4

The fluorinated polymer having ion exchange capacity and $T_Q$ of Example 1 was superposed and pressed on a fabric made of polytetrafluoroethylene (50 mesh: 100 denier) at 195° C. under 30 kg/cm² for 5 minutes by a press machine. And then, in accordance with the process of Example 3 except using the media and the conditions shown in Table 4, the pretreatment and the electrolysis and the measurement of the characteristics were carried out. The results are shown in Table 4.

TABLE 4

| No. | Medium | Condition | | | | Characteristic | |
|---|---|---|---|---|---|---|---|
| | | Conc. (%) | Temp. (°C.) | Time (hr.) | $\Delta W_R$ (%) | Current eff. (%) | Wrinkle |
| Exp. 4-1 | NaCl | 10.8 | 25 | 1 | 14.4 | 95 | None |
| Exp. 4-2 | NaCl | 5.6 | 25 | 1 | 15.7 | 95 | None |
| Exp. 4-3 | NaBr | 9.9 | 25 | 1 | 15.1 | 95 | None |
| Exp. 4-4 | NaI | 14.4 | 25 | 1 | 15.5 | 95 | None |
| Exp. 4-5 | Na₂SO₄ | 3.6 | 25 | 1 | 15.1 | 95 | None |
| Exp. 4-6 | Na₃PO₄ | 14.2 | 25 | 1 | 15.5 | 95 | None |

EXAMPLE 5

The fluorinated polymer having the ion exchange capacity and $T_Q$ of Example 1 was used to fabricate it into the membrane. The hydrolysis of methyl ester groups was carried out in 19% aqueous solution of KOH at 90° C. for 16 hours. Then, the pretreatment was carried out in 3% aqueous solution of KOH at room temperature for 1 hour. The value of $\Delta W_R$ was 12%.

An electrolysis of an aqueous solution of potassium chloride (KCl) was carried out at 90° C. in 20 A/dm² to obtain 35% of KOH for 50 days.

The current efficiency was 97% and no wrinkle was found after the electrolysis.

We claim:

1. A cation exchange membrane fabricated from a fluorinated polymer and useful for the electrolysis of an alkali metal chloride prepared by a process, comprising: treating a cation exchange membrane having ion exchange groups of the formula: —COOM, wherein M is hydrogen, an alkaline earth metal or an alkali metal or groups convertible to said —COOM group and having an ion exchange capacity ($A_R$) of 0.5 to 2.0 meq/g dry polymer in a hydrolyzed form in an aqueous medium of a base or a slat at a concentration of 1 to 20 wt. % at the temperature of 0° to 60° C. after hydrolysis or at the time of hydrolysis, said treated membrane exhibiting a weight gain percent ($\Delta W_R$) in the range of $\Delta W_R = 1.6 e^{1.7 A_R}$ on the upper side; $\Delta W_R = 0.8 e^{1.7 A_R}$ on the lower side; $A_R = 0.5$ on the left side and $A_R = 2.0$ on the right side shown in FIG. 1 (log scale on ordinate).

2. The cation exchange membrane of claim 1, wherein the membrane is treated by the aqueous medium of an alkali or alkaline earth metal hydroxide or neutral salt to give a membrane product having a $\Delta W_R$ in said range.

3. The cation exchange membrane of claim 1, wherein the membrane is treated with an aqueous alkali metal or alkaline earth metal hydroxide solution at the time of hydrolysis, thereby fabricating said membrane having a $\Delta W_R$ within said range.

4. The cation exchange membrane of claim 1, 2 or 3, wherein the pretreatment is conducted such that the resulting membrane exhibits a weight gain percent $\Delta W_R$ within the range of $\Delta W_R = 1.5 e^{1.7 A_R}$ on the upper side; $\Delta W_R = 0.9 e^{1.7 A_R}$ on the lower side; $A_R = 0.9$ on the left side and $A_R = 1.7$ on the right side.

5. The cation exchange membrane of claim 1, 2 or 3, wherein the fluorinated polymer for the cation exchange membrane comprises main units of the formulas:

  (a)

  (b)

wherein X represents fluorine, chlorine, or —CF$_3$; X' represents X of CF$_3$(CF$_2$)$_m$; m represents 1 to 5; and Y represents

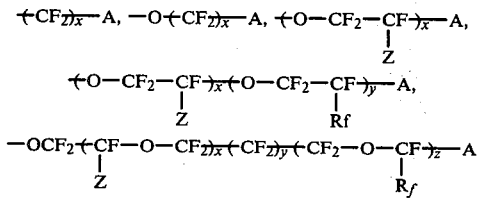

wherein x, y and z are each integers of 1 to 10; Z and R$_f$ each represent —F or a C$_1$–C$_{10}$ perfluoroalkyl group; A represents —COOM or a member selected from the group consisting of —CN, —COF, —COOR, —CONR$_2$R$_3$, and —CF$_2$SO$_2$F each of which can be converted to group: —COOM by hydrolysis, neutralization, oxidation or reduction and R$_1$, R$_2$ and R$_3$ each represent a C$_1$–C$_{10}$ alkyl group.

6. The cation exchange membrane of claim 5, wherein the membrane is substantially fabricated from a fluorinated polymer containing units (a) and (b).

7. The cation exchange membrane of claim 5, wherein one side of the membrane which faces the cathode of an electrolysis cell is fabricated of the fluorinated polymer containing units (a) and (b).

8. A process of electrolyzing an aqueous alkali metal chloride solution, comprising: conducting the electrolysis of said alkali metal chloride in an electrolysis cell containing an anode compartment and a cathode compartment separated by the cation exchange membrane of claim 1, 2 or 3.

9. A process for electrolyzing an aqueous alkali metal chloride solution, comprising: conducting the electrolysis of said alkali metal chloride in an electrolysis cell containing an anode compartment and a cathode compartment separated by the cation exchange membrane of claim 4.

10. A process of electrolyzing an aqueous alkali metal chloride solution, comprising: conducting the electrolysis of said alkali metal chloride in an electrolysis cell containing an anode compartment and a cathode compartment separated by the cation exchange membrane of claim 5.

11. A process of electrolyzing an aqueous alkali metal chloride solution, comprising: conducting the electrolysis of said alkali metal chloride in an electrolysis cell containing an anode compartment and a cathode compartment separated by the cation exchange membrane of claim 6.

12. A process of electrolyzing an aqueous alkali metal chloride solution, comprising: conducting the electrolysis of said alkali metal chloride in an electrolysis cell containing an anode compartment and a cathode compartment separated by the cation exchange membrane of claim 7.

* * * * *

UNITED STATES PATENT AND TRADEMARK OFFICE
CERTIFICATE OF CORRECTION

PATENT NO. : 4,270,996
DATED : JUNE 2, 1981
INVENTOR(S) : MANABU SUHARA ET AL

It is certified that error appears in the above-identified patent and that said Letters Patent is hereby corrected as shown below:

In Column 6, Line 45, change the equation as shown to:

$$\Delta W_R = \frac{W_1 - W_2}{W_2} \times 100$$

Signed and Sealed this

Nineteenth Day of June 1984

[SEAL]

Attest:

GERALD J. MOSSINGHOFF

Attesting Officer

Commissioner of Patents and Trademarks